United States Patent [19]

Hooper

[11] 4,030,829

[45] June 21, 1977

[54] KEYING WAVEFORM GENERATOR FOR SPECTROPHOTOMETER

[75] Inventor: Gerald E. Hooper, Los Altos Hills, Calif.

[73] Assignee: Varian Associates, Palo Alto, Calif.

[22] Filed: Apr. 12, 1976

[21] Appl. No.: 676,075

[52] U.S. Cl. .................................. 356/97; 356/95
[51] Int. Cl.² ......................................... G01J 3/42
[58] Field of Search .............................. 356/93–97, 356/179, 205, 211, 212

[56] References Cited

UNITED STATES PATENTS

| | | | |
|---|---|---|---|
| 3,659,942 | 5/1972 | Vergato | 356/95 X |
| 3,895,874 | 7/1975 | Ogiwara | 356/93 |
| 3,967,900 | 7/1976 | Henninger et al. | 356/93 X |
| 3,985,441 | 10/1976 | Schoeffel et al. | 356/97 |

Primary Examiner—Edward S. Bauer
Assistant Examiner—F. L. Evans
Attorney, Agent, or Firm—Stanley Z. Cole; Gerald M. Fisher; John J. Morrissey

[57] ABSTRACT

In a double beam spectrophotometer employing a rotating optical chopper to direct a beam of electromagnetic radiation alternately through sample and reference channels to a photomultiplier tube, a beam interrupter is used in combination with a photodiode and a photocell to generate a square wave signal having a predetermined temporal relation to the rotation of the optical chopper. The square wave signal is integrated to provide a triangular waveform, whose maxima and minima correspond, respectively, to the passage of the beam through one or the other of the sample and reference channels, and whose cross-over points with respect to a zero reference level correspond to dark intervals during which the beam is blocked from entering either channel. Keying circuitry responsive to the cross-over points provides for detection of dark current generated by the photomultiplier tube, while keying circuitry responsive to the maxima and minima synchronizes analysis circuitry associated with the sample and reference channels with the passing of the beam therethrough and provides for correction of the output of the photomultiplier tube to compensate for dark current.

16 Claims, 10 Drawing Figures

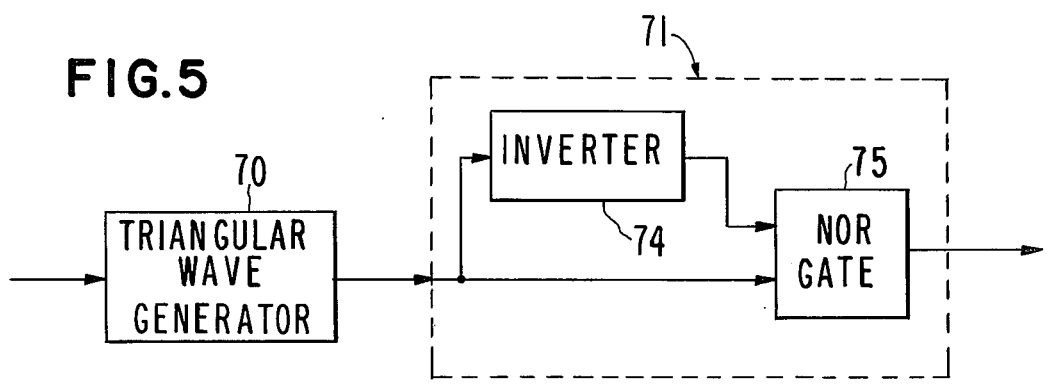
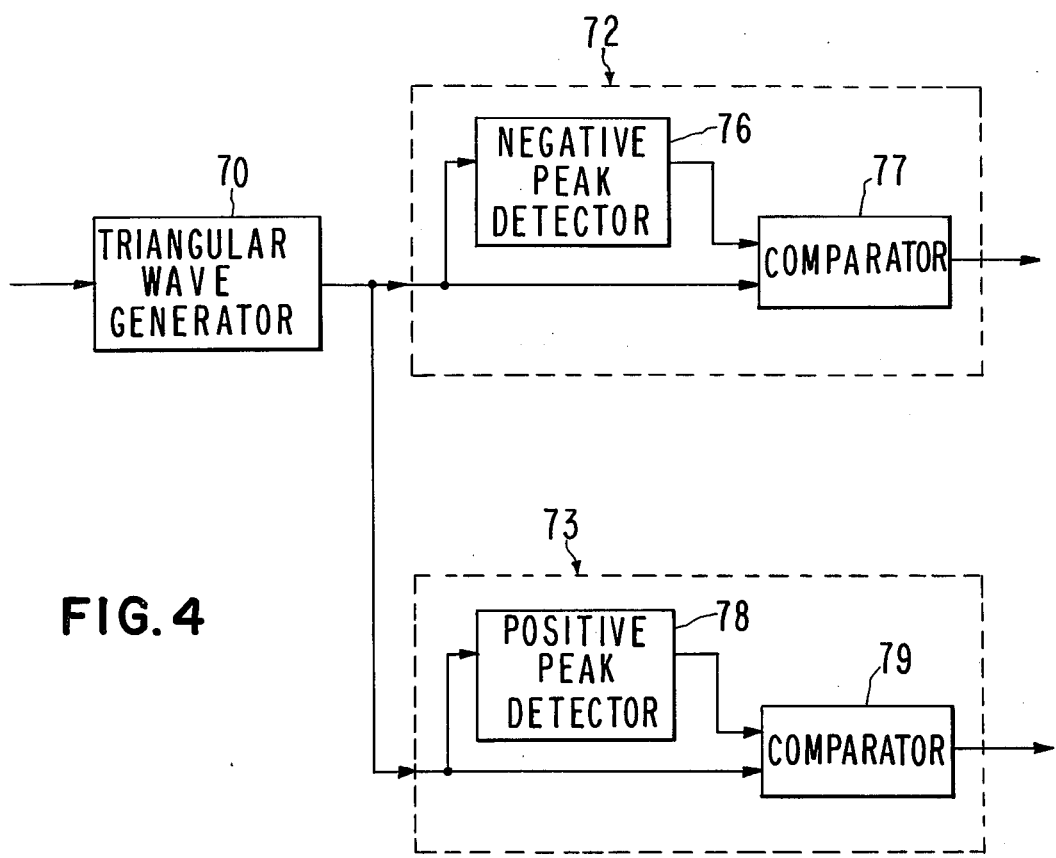

KEYING WAVEFORM GENERATOR FOR SPECTROPHOTOMETER

BACKGROUND OF THE INVENTION

1. Field of the Invention

This invention is a further development in the field of dual beam spectrophotometry, and in particular is directed to means for keying electronic circuitry for comparing signals from the separate channels of a spectrophotometer with the rotational motion of an optical chopper for directing radiation alternatively to the separate channels, where the rotational motion of the chopper may not be constant.

2. Prior Art

Heretofore, in dual beam spectrophotometry, where an optical chopper has been used to direct radiation alternately into two separate channels, various techniques have been used to provide pulsed signals wherein a particular temporal characteristic of a given pulse corresponds to a particular rotational position of the chopper. For example, the chopper disc could be encoded to generate a pulsed electrical signal wherein the pulses correspond temporally to the occurrence of particular optical events such as the passage of radiation into one or the other of the channels of the instrument. If a number of optical events are to be keyed to electronic circuitry, it was necessary in the prior art to encode the chopper disc, or some mechanical member whose motion is synchronized with the rotation of the chopper disc, in order to provide a separate pulsed signal for each optical event of interest. Typically, in the prior art, a number of light source and photocell pairs were used to provide an individual pulsed signal for each optical event being monitored.

SUMMARY OF THE INVENTION

In a dual beam spectrophotometer, e.g., for use in chromatography, an optical chopper directs radiation from a source alternately through a sample channel and a reference channel to a photodetector. Electronic circuitry compares the relative intensities of the radiation beams incident upon a single photodetector from the sample and reference channels. The chopper comprises a rotatable disc disposed between the radiation source and the sample and reference channels. The chopper disc is segmented to provide direct transmission of the radiation into one channel during one-quarter of a complete rotation, followed by blockage of the radiation from both channels during the next quarter rotation, followed by reflection of the radiation into the other channel during the subsequent quarter rotation, followed by another blockage of the radiation from both channels during the final quarter of the complete rotation of the disc.

Electronic circuitry is keyed to the rotation of the chopper so that comparison of signals from the two channels can be precisely synchronized with the passage of radiation through the respective channels. A dark interval is provided between the passage of radiation through either of the channels in order to permit measurement and storage of any signal that may be generated by the photodetector independently of the radiation emanating from the sample and reference channels. In this way, dark current corrections can be applied to the outputs of the sample and reference channels.

Keying of the electronic circuitry to the rotation of the chopper is accomplished by an optical interrupter disc fixedly coupled to the chopper motor linkage. The interrupter disc is configured to generate, in combination with a light-emitting diode and a photocell, a substantially square wave signal that is precisely synchronized with the rotational position of the chopper disc. Light from the light-emitting diode falls upon the photocell only when the interrupter disc so permits. The photocell, therefore, can generate a voltage signal indicative of the rotational position of the chopper disc, but whose amplitude is subject to variation depending upon fluctuations in the characteristics of the light-emitting diode and in the line voltage to the light-emitting diode. In the preferred embodiment of this invention, the square wave output of the photocell is fed to an amplifier circuit which produces a constant voltage signal of, for example, +15 volts whenever the interrupter permits light to fall upon the photocell, and −15 volts whenever the interrupter blocks light from falling upon the photocell. This bipolar square wave of uniform height above and below the zero voltage reference level is then integrated to provide a bipolar triangular waveform. The maxima and minima of the triangular waveform, which in a particular embodiment may have values such as +8.5 volts and −8.5 volts, respectively, are temporally synchronized with the passage of radiation through one or the other of the sample and reference channels, and the points at which the triangular waveform crosses the zero voltage reference line correspond to dark intervals when no radiation is allowed to pass through either of these channels.

The output of the photodetector, which in the preferred embodiment is a photomultiplier tube, is a mixed signal determined by the optical absorption properties of the constitutents of the materials flowing in the sample and reference channels, respectively. The photodetector output signal is transmitted to a preamplifier, which in turn transmits an amplified mixed signal simultaneously to sample and reference demodulators. The demodulators, in turn, provide unmixed spectral signals determined, respectively, by the constituents in each of the channels. The outputs of the sample and reference demodulators may be corrected as discussed hereinafter to compensate for dark current generated by the photomultiplier tube, and are thereupon transmitted to a comparator. The output of the comparator is a difference or ratio signal that provides spectral information for identifying (qualitatively, and perhaps also quantitatively) the constituents in the sample channel.

The dark-current corrected outputs of the sample and reference demodulators are synchronized with the actual passing of the radiation through the sample and reference channels, respectively, by keying pulses that are generated whenever particular values of the triangular waveform occur. In this way, the outputs of the sample and reference demodulators are synchronized with the actual rotation of the optical chopper, and are not dependent upon a fixed rate of chopper rotation.

A keying means responsive to the crossing of the zero voltage reference level by the triangular waveform generates input signals to the preamplifier, which gate suitable circuitry to detect and store any current generated by the photomultiplier tube during the dark interval. This so-called dark interval keying means comprises circuitry for monitoring predetermined positive and negative voltage levels above and below, respectively, the zero voltage reference level of the triangular waveform. Whenever the value of the triangular waveform is above or below these predetermined positive and negative voltage levels, a negative voltage signal, as of −14 volts, is generated. However, whenever the value of the triangular waveform is within the interval between the predetermined positive and negative voltage levels, a positive voltage pulse of, for example, +14 volts is generated to indicate that the waveform is passing through a cross-over point. The temporal width of the positive voltage pulses on this dark pulse wave train is a direct function of the threshold value selected for the predetermined positive and negative voltage levels above and below the zero voltage reference level for the triangular waveform. These positive voltage pulses of the dark pulse train serve as the keying signals to the preamplifier.

A second keying means responsive to the minima of the triangular waveform generates input signals to gate the sample demodulator, and to gate suitable circuitry for correcting the output of the sample demodulator to compensate for dark current generated by the photomultiplier tube. This so-called sample interval keying means comprises means for monitoring a predetermined negative voltage level for each temporal interval between successive minima on the triangular waveform. The values of successive minima will vary if the rotational speed of the optical chopper changes. Ordinarily, it is desirable for the rotational speed of the chopper to be maintained constant, although such changes can be anticipated due to, e.g., changes in line voltage or frequency to the motor driving the chopper. The keying technique of this invention is designed to accommodate such rotational speed changes. During any given interval between adjacent minima on the triangular waveform, the value of the monitored negative voltage level is greater (i.e., less negative) than the value of the immediately preceding minimum voltage level by a selected small amount, as of 1.5 volts. For each succeeding interval, the monitored negative voltage level differs from the value of the immediately preceding minimum voltage level by the same selected small amount. In other words, the differential between the monitored negative voltage level and the preceding minimum voltage level remains constant, although the monitored negative voltage level varies with changes in the rotational speed of the chopper. Whenever the value of the triangular waveform is greater (i.e., less negative) than the negative voltage level being monitored, a negative signal of, for example, −14 volts is generated. However, whenever the triangular waveform reaches a value that is lower (i.e., more negative) than the monitored negative voltage level, a positive voltage pulse, as of +14 volts, is generated, which is an indication that the triangular waveform is passing through a minimum value. The temporal width of the positive voltage pulses on this sample pulse wave train is a direct function of the selected differential between the monitored negative voltage level for a given cycle and the minimum voltage level at the beginning of that cycle. These positive pulses of the sample pulse train serve as keying input signals to the sample demodulator.

In a similar manner, a third keying means responsive to the maxima of the triangular waveform generates input signals to gate the reference demodulator, and to gate suitable circuitry for correcting the output of the reference demodulator to compensate for dark current generated by the photomultipler tube. This so-called reference interval keying means comprises means for monitoring a predetermined positive voltage level for each temporal interval between successive maxima on the triangular waveform. The values of successive maxima will vary if the rotational speed of the optical chopper changes. During any given interval between adjacent maxima on the triangular waveform, the value of the monitored positive voltage level is less than the value of the immediately preceding maximum voltage level by a selected small amount, as of 1.5 volts. For each succeeding interval, the monitored positive voltage level differs from the value of the immediately preceding maximum voltage level by the same selected small amount. Thus, the differential between the monitored positive voltage level and the preceding maximum voltage level remains constant, although the monitored positive voltage level varies with changes in the rotational speed of the chopper. Whenever the value of the triangular waveform is less than the monitored positive voltage level, a negative voltage signal, as of −14 volts, is generated. However, whenever the triangular waveform attains a value that is greater than the monitored positive voltage level, a positive voltage pulse, as of +14 volts, is generated, which is an indication that the triangular waveform is passing through a maximum value. The temporal width of the positive voltage pulses on this reference pulse wave train is a direct function of the selected differential between the monitored positive voltage level for a given cycle and the maximum voltage level at the beginning of that cycle. These positive pulses of the reference pulse train serve as keying input signals to the reference demodulator.

It is an object of this invention to synchronize electrically timed events in the operation of a dual beam spectrophotometer relative to the rotational motion of an optical chopper by means of a separate keying signal for each event, where the rate of rotation of the chopper may vary and where the keying signals are all derived from a single rotational position sensor. Specific events to be synchronized with the motion of the chopper, according to the embodiment of the invention disclosed herein, are the selection of sample and reference channels and the correction of output signals to compensate for dark current.

In furtherance of the aforestated object of this invention, the rotational position sensor generates a substantially square wave signal, from which a triangular waveform is derived that is synchronized with the rotational motion of the chopper. Means responsive to the maxima and minima on the triangular wave form generate pulsed keying signals for gating electronic circuitry pertaining to channel selection, and means responsive to cross-over points with respect to a zero voltage level on the triangular waveform generate a pulsed keying signal for gating circuitry pertaining to dark current compensation.

BRIEF DESCRIPTION OF THE DRAWING

FIGS. 3A through 3F provide waveforms for pertinent signals generated by the circuitry shown in FIG. 2.

FIG. 4 is a functional diagram of that portion of the electronic circuitry indicated by blocks 70, 72 and 73 in FIG. 2.

FIG. 5 is a functional diagram of that portion of the electronic circuitry indicated by blocks 70 and 71 in FIG. 2.

DETAILED DESCRIPTION OF THE PREFERRED EMBODIMENT

Figure 1:
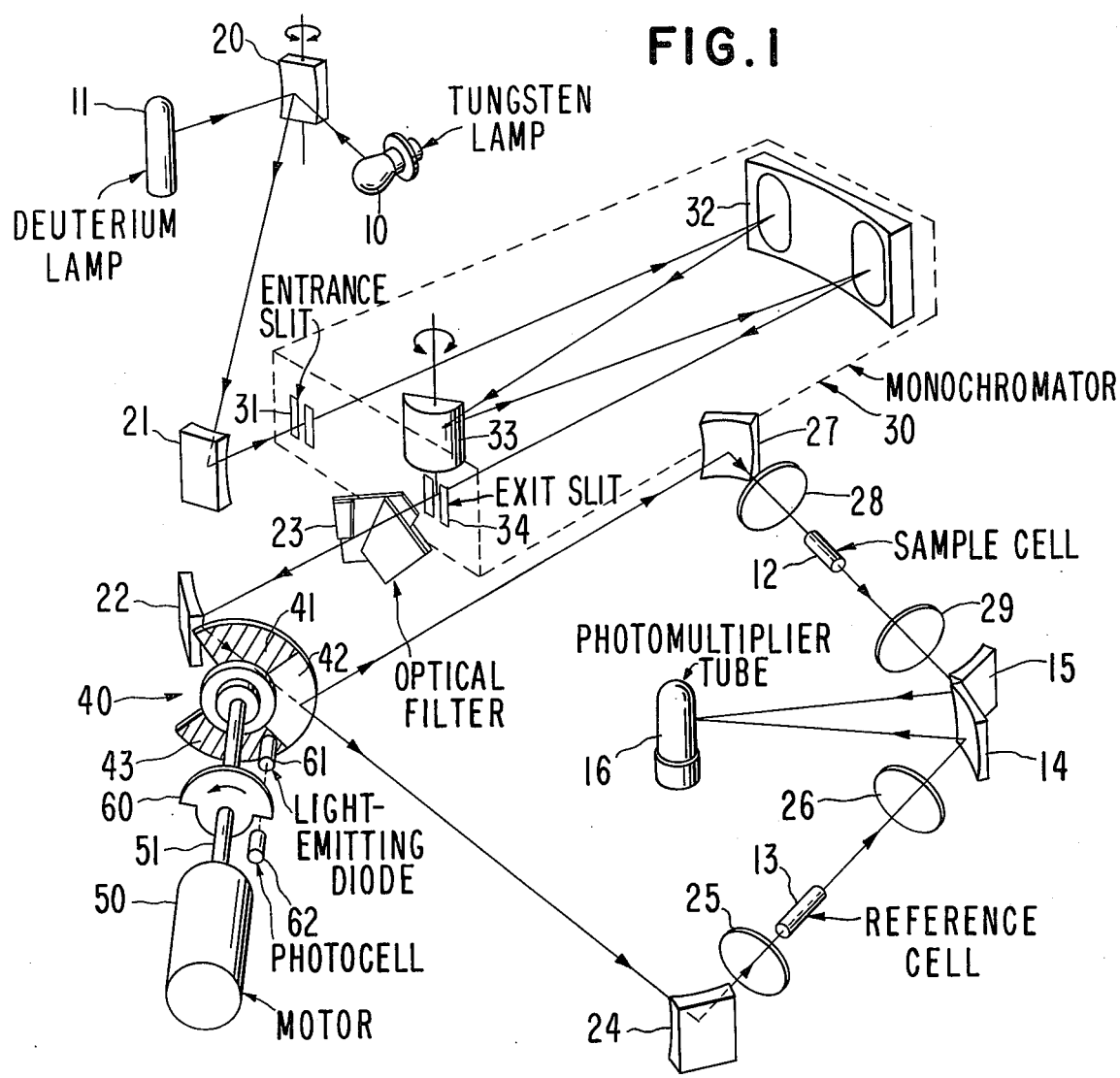
FIG. 1 is an optical diagram showing the path of electromagnetic radiation through sample and reference channels in a dual beam spectrophotometer according to the present invention.

FIG. 1 shows the arrangement of the optical components of a preferred embodiment of this invention. Electromagnetic radiation from a source such as a tungsten lamp 10 or a deuterium lamp 11 is directed through a monochromator 30, and thence alternately through two different channels such as the sample and reference channels of a chromatographic apparatus. The sample channel, as shown in FIG. 1, comprises a flow cell 12 through which sample material to be analyzed can pass, preferably at a controllable flow rate. Similarly, the reference channel comprises a flow cell 13 through which a reference material of known physical or chemical characteristics can pass, preferably at a controllable flow rate. Control of the flow rate for the sample and reference material is advantageous in minimizing solvent and other effects in comparing optical output signals from the sample and reference channels. In a particular embodiment, the internal volume of the sample cell 12, and of the reference cell 13, may be in the order of 8 microliters, and the path length of radiation through each cell may be in the order of 10 millimeters. The sample and reference cells are typically isolated from the components of the optical system of the instrument in order to prevent contamination of optical surfaces by vapors emanating from the sample and reference cells. In particular applications where high sensitivity detection of constituents of the sample material is required, the sample cell can be thermostated with a circulating liquid bath.

Radiation from a particular source, such as ultraviolet radiation from the deuterium lamp 11, or visible light from the tungsten lamp 10, may be directed through a monochromator (such as the Ebert-configuration monochromater 30 shown in FIG. 1) to provide a beam of radiation of a particular wavelength for passage through the sample and reference cells. A radiation source condensing mirror 20 is rotatably mounted to permit radiation from either lamp 10 or lamp 11 to be selectively directed toward a spherical field mirror 21. The mirror 21 directs an image of the filament of the lamp 10, or an image of the arc of the lamp 11, onto the entrance slit 31 of the monochromator 30. The image of the entrance slit 31 is then collimated by the spherical mirror 32, and the resultant beam is directed toward a diffraction grating 33. The grating 33 is rotatably mounted to provide wavelength selection. Typically, the tungsten lamp provides radiation from 340 nanometers to the upper visible wavelength limit, while the deuterium lamp provides radiation in the range from 200 to 400 nanometers. The Ebert monochromator 30 suitable for operation within these wavelength ranges may have a diffraction grating 33 blazed at 250 nanometers and containing 1200 lines per millimeter. The radiation dispersed by the diffraction grating 33 is directed back to the collimating mirror 32, whereupon the dispersed light is focused onto an exit slit 34. For source wavelengths in the ranges stated above, the entrance and exit slits 31 and 34 may be variable from 0.4 to 3.2 millimeters in binary steps corresponding to the spectral bandwidth of the incident radiation.

The radiation passing out of the monochromator 30 through the exit slit 34 is directed onto a toroidal mirror 22, which reflects the radiation toward an optical chopper 40.

In the preferred embodiment, an optical filter 23, which may comprise several separate elements, each element being applicable over a particular wavelength region, is disposed between the exit slit 34 of the monochromator 30 and the mirror 22. The filter 23 provides order sorting of the wavelengths exiting from the exit slit 34 in order to eliminate multiples of the desired wavelength. The filter 23 also reduces stray light effects caused by optical characteristics of the components of the monochromator 30. The filter 23 is preferably activated by the same mechanism that is used to rotate the diffraction grating 33 in order to select the desired wavelength. Thus, as different wavelengths are selected, appropriate filter elements may be automatically positioned in place in the radtion beam.

The optical chopper 40 is configured to provide dual optical paths for the radiation reflected from the mirror 22, as well as dark time intervals during which radiation from the mirror 22 is completely blocked. The chopper 40 comprises a disc having four distinct segments, each segment being a 90° sector of the disc. One segment of the disc is transparent to the radiation reflected from the mirror 22. This transparent segment may be simply a 90° sector cut out from the disc 40 so that the beam reflected from the mirror 22 can pass directly through the cut-out segment and impinge upon a toroidal mirror 24, which focuses the beam through a silica window 25 on the reference cell 13. The beam, upon leaving the reference cell 13, passes through a similar window 26 and is then focused by a spherical mirror 14 onto a photomultiplier tube 16. The windows 25 and 26 serve to isolate the reference cell 13 from the compontents of the optical system. The optical path for the radiation beam from the mirror 22 through the cut-out segment of the chopper disc 40 to the mirror 24, and thence through the window 25 into the reference cell 13, and thence through the window 26 to the mirror 14, and thence to the photomultiplier tube 16, is designated hereinafter as the "reference channel" of the spectrophotometer. The chopper disc 40 is rotatably mounted so that the radiation beam reflected from the mirror 22 is directed through the reference channel for one-quarter of a complete rotation, and is completely blocked by an opaque portion 41 of the chopper disc 40 during the next succeeding quarter of a complete rotation. During the subsequent quarter rotation, a plane mirror segment 42 of the chopper disc 40 intercepts the beam from the mirror 22 and directs the beam toward a toroidal mirror 27, from whence the beam passes through a window 28 into the sample cell 12. The beam, upon exiting from the sample cell 12, passes through a window 29 and is focused by a spherical mirror 15 onto the photomultiplier tube 16. The windows 28 and 29 serve to isolate the sample cell 12 from the components of the optical system. The optical path for the radiation beam from the mirror 22 to the mirror segment 42 of the chopper disc 40, and thence to the mirror 27, and thence through the window 28 into the sample cell 12, and thence through the window 29 to the mirror 15, and thence to the photomultiplier tube 16, is designated hereinafter as the "sample channel" of the spectrophotometer.

During the final quarter of a complete rotation, an opaque section 43 of the chopper disc 40 provides complete blockage of the radiation beam from both the reference channel and the sample channel.

The optical chopper 40 provides dual optical paths for the radiation beam, i.e., a path through the reference channel and a path through the sample channel. There is no beam splitting that would reduce the intensity of the radiation beam through either channel. The entire radiation beam passes alternately through one channel or the other. This feature is of importance in optical detectors for liquid chromatography, where apertures for admitting radiation into the sample and reference cells are usually quite narrow. In addition to providing dual optical paths, the chopper 40 also provides dark intervals during which any dark current generated by the photomultiplier tube 16 independently of the radiation directed to the tube 16 from the mirrors 14 and 15 can be sensed. In this way, a correction for dark current can be made.

The optical chopper 40 is mounted on a shaft 51 of a motor 50. The motor 50 rotationally drives the chopper 40 at a rate which typically is in the order of 1500 rpm. Rigidly affixed to the motor shaft 51 is a single electrical switching means for sensing the angular position of the chopper 40. Any suitable switching mechanism, such as a mechanical or magnetic switch, which can be made to change electrical state at well-defined angular positions of the shaft 51, may be used. In the preferred embodiment, the switching means comprises an optical interrupter disc 60 mounted on the shaft 51. As shown in FIG. 1, the interrupter disc 60 is generally circular with an outer edge portion being removed for a selected segment, e.g., for a 180° sector, of the disc.

A light-emitting diode 61 is positioned on one side of the interrupter disc 60, and a photocell 62 is positioned on the other side thereof. The light-emitting diode 61 and the photocell 62 are disposed so that light from the diode 61 will be incident upon the photocell 62 during one-half of a complete rotation of the interrupter disc 60, but will be blocked by the larger-diameter segment of the interrupter disc 60 from impinging upon the photocell 62 during the other half of the rotational cycle. In a particular embodiment, the interrupter disc 60 is precisely mounted on the motor shaft 51 with respect to the chopper disc 40 such that light from the diode 61 can reach the photocell 62 only during the time interval extending from the temporal half-way point in the passage of radiation through one of the channels (e.g., the sample channel) to the temporal half-way point in the passage of radiation through the other channel (e.g., the reference channel). It is recognized that other relative angular positions between the interrupter disc 60 and the optical chopper 40 may be used to provide a fixed time lag between the passing of radiation through a particular one of the channels and the impinging of light from the photodiode 61 upon the photocell 62.

The waveform shown in FIG. 3A illustrates the temporal variation in the intensity of radiation received by the photomultiplier tube 16. Time $t = 0$ corresponds to that rotational position of the chopper 40 at which the opaque segment 41 first intercepts the radiation beam reflected from the mirror 22. In the following discussion, the rotational direction of the chopper disc 40 is taken to be counterclockwise as viewed from the side on which the interrupter disc 60 is located. During the first one-quarter rotation of the chopper 40, no radiation reaches the photomultiplier tube 16. After one-quarter of a complete rotation, the beam from the mirror 22 is reflected by the mirror surface 42 into the sample channel until the end of the second quarter rotation. During the third quarter rotation, no radiation reaches the tube 16. During the last quarter rotation, the beam from the mirror 22 is transmitted directly through the cut-out segment of the chopper 40 into the reference channel.

The output of the photocell 62 is substantially a square wave indicative of when light from the photodiode 61 is permitted by the interrupter disc 60 to reach the photocell 62. The amplitude of the output of the photocell 62, however, can be affected by time-varying factors such as the characteristics of the diode 61. For this reason, the output of the photocell 62 is preferably fed to an amplifier, not shown, which generates a constant positive voltage signal, e.g., +15 volts, whenever light from the diode 61 reaches the photocell 62, and which generates a constant negative voltage, e.g., −15 volts, whenever light from the diode 61 is blocked from reaching the photocell 62. The output of this amplifier is a square waveform of constant amplitude, as shown in FIG. 3B. The waveform shown in FIG. 3B has a fixed phase relative to the rotation of the chopper 40. This square waveform is fed to a triangular waveform generator 70. The triangular waveform generator 70 simply integrates the area under the curve in FIG. 3B, so as to generate the triangular wave form shown in FIG. 3C. The triangular waveform of FIG. 3C has maximum and minimum values, (on the order of of +8.5 volts and −8.5 volts, respectively, above and below a zero voltage reference level), which values vary as the rotational speed of the chopper 40 changes. However, even if the rotational speed of the chopper 40 changes, the phase relationship of the maxima and minima on the triangular waveform shown in FIG. 3C remains constant.

Figure 2:
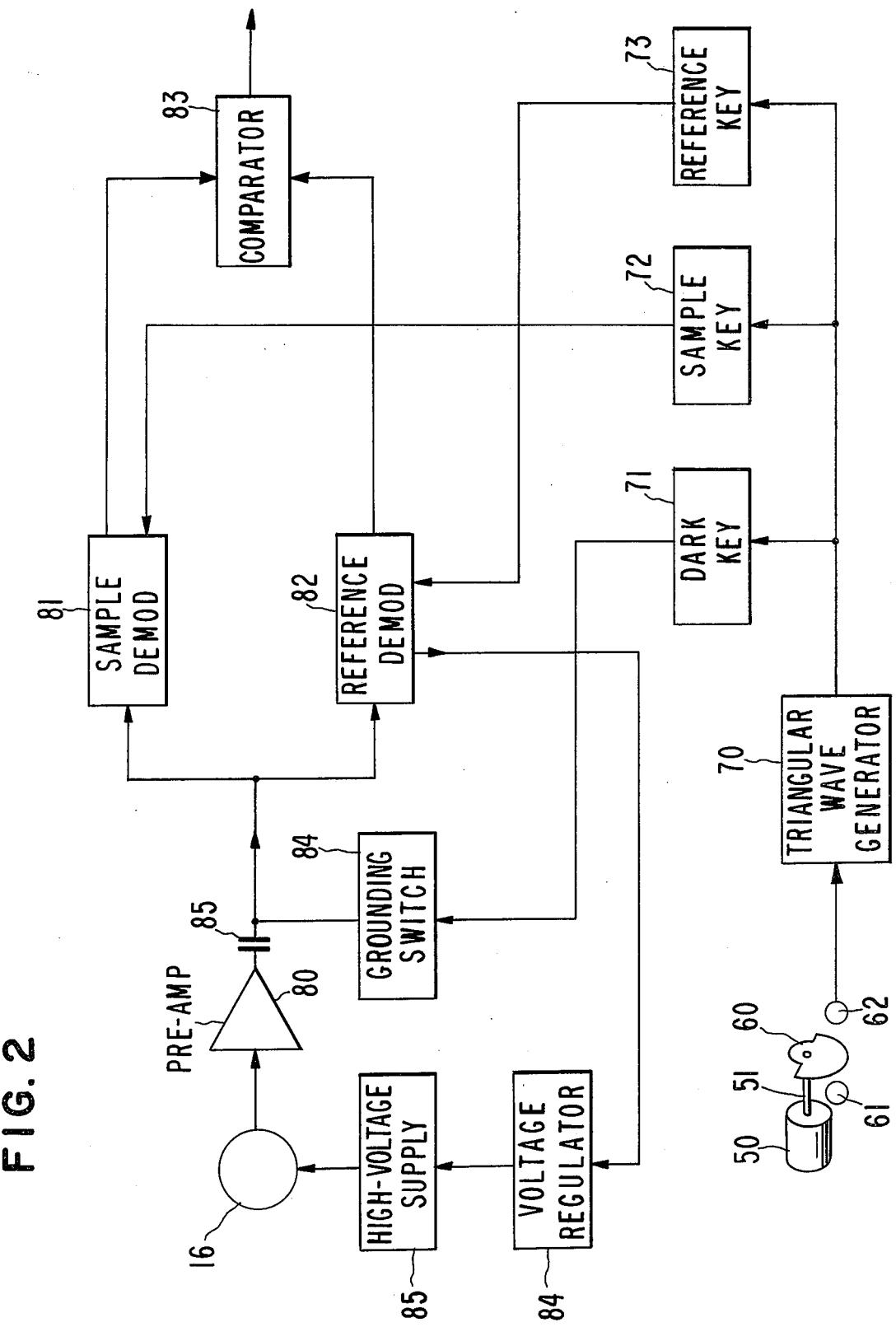
FIG. 2 is a functional diagram of the electronic circuitry of the present invention.

As seen in FIG. 2, the photomultiplier tube 16 receives radiation alternatively from the reference channel and the sample channel, with dark intervals between the reception of radiation from either channel. The electronic output from the photomultiplier tube 16 has a square waveform, which corresponds to the curve shown in FIG. 3A. The square waveform output of the tube 16 is transmitted to a preamplifier 80, where buffering and amplification of the signal take place. The output signal from the preamplifier 80 is then transmitted as a pulsed waveform to a sample demodulator 81 and to a reference demodulator 82 simultaneously. The sample and reference demodulators 81 and 82, respectively, are gated so that each receives the output signal from the preamplifier 80 only during those particular time intervals corresponding to the passing of the radiation beam therethrough.

During the time that the sample demodulator 81 is gated to receive the output of the preamplifier 80, the radiation beam passes through the sample channel. Similarly, during the time that the reference demodulator 82 is gated to receive the output signal from the preamplifier 80, the radiation beam passes through the reference channel. The output signal from the sample demodulator 81 is proportional to the intensity of the radiation transmitted through the sample cell 12, and the output signal from the reference demodulator 82 is proportional to the intensity of the radiation transmitted through the reference cell 13. The output signals from the sample and reference demodulators 81 and 82, respectively, are fed to a comparator 83, which comprises means for generating a signal indicative of the difference or ratio of the two signals. The difference or ratio output signal from the comparator 83 is indicative of the extent to which the sample material flowing through the sample cell 12 has absorbed energy from the radiation beam passing therethrough. This information can be used to provide a qualitative and/or quantitative determination of the presence of certain substances of interest in the sample material.

In the preferred embodiment, a second output signal from the reference demodulator 82 is compared with a constant reference signal to provide a difference signal indicative of any variation in the output of the reference demodulator 82. Whenever any such variation in the output of the reference demodulator 82 occurs, the difference signal activates a voltage regulator 84 to adjust a high voltage supply 85, which applies a corrected signal to the dynode circuit of the photomultiplier tube 16 in order to maintain the output of the photomultiplier tube 16 at a constant level during the time that the radiation beam is passing through the reference channel. By this technique, any change in the output of the reference demodulator 82 provides a feedback to the dynode voltage so as to cancel any variation in the output of the photomultiplier tube 16 during the time that the radiation beam is passing through the reference channel.

The gating of the sample and reference demodulators 81 and 82, respectively, is accomplished by a sample keying generator 72 and by a reference keying generator 73, respectively. The sample keying generator 72 is responsive to the minima of the output signal from the triangular waveform generator 70, while the reference keying generator 73 is responsive to the maxima of that same curve. The minima of the triangular waveform occur only when the radiation beam from the source 10 or 11 is passing through the sample channel, as can be seen in FIGS. 3C and 3D. Similarly, the maxima of the triangular waveform occur only when the radiation beam is passing through the reference channel, as can be seen in FIGS. 3C and 3E.

The sample keying generator 72 comprises means for generating the sample pulse train waveform shown in FIG. 3D, and the reference keying generator 73 comprises means for generating the reference pulse train waveform shown in FIG. 3E. Since the triangular waveform shown in FIG. 3C results from the integration of a fixed-amplitude square wave, as shown in FIG. 3B, it has a fixed phase relationship to the square wave and a fixed slope. However, the maxima and minima on the triangular waveform vary with the frequency of the square wave. As the rate of rotation of the optical chopper 40 increases, the absolute value of the maximum and minimum peaks of the triangular waveform correspondingly decreases. Similarly, as the rate of rotation of the optical chopper 40 decreases, the absolute value of the maximum and minimum peaks of the triangular waveform increases. The sample keying generator 72 includes means for comparing the instantaneous value of the triangular waveform with a monitored predetermined negative value that is slightly greater (i.e., less negative) than the immediately preceding negative voltage peak. This predetermined negative value is redetermined after each negative voltage peak (or minimum value) is reached, so that the differential between the monitored predetermined negative value of the triangular waveform at any given instant in time and the immediately preceding negative voltage peak remains constant. The redetermination of the monitored negative voltage after each negative voltage peak is reached provides for synchronization, as discussed hereinafter, independently of any changes in the rate of rotation of the chopper 40 that may occur.

In the embodiment shown in FIG. 4, the output of the triangular waveform generator 70 is fed to a negative peak detector 76. During each cycle of the triangular waveform, suitable circuitry associated with the negative peak detector 76 stores a negative voltage signal that is a predetermined percentage of the preceding negative peak occurring during that cycle. This stored signal is the monitored negative voltage level. The output of the negative peak detector 76 is fed to a comparator 77, which generates a positive signal whenever the output of the triangular waveform generator 70 is less (i.e., more negative) than the stored negative voltage signal, and a negative signal whenever the output of the triangular waveform generator 70 is greater (i.e., less negative) than the stored negative voltage signal.

Whenever the output of the triangular wave generator 70 is greater than the monitored negative voltage level, the sample keying generator 72 generates a constant negative voltage signal as shown in FIG. 3D. However, whenever the output of the triangular waveform generator 70 reaches a value less than the monitored negative voltage level, the sample keying generator 72 generates a positive voltage pulse as shown by the sample pulse train of FIG. 3D. The value of the differential between the monitored negative voltage level and the immediately preceding negative voltage peak for any point on the triangular waveform is selected to provide the desired temporal width for the positive pulses in the sample pulse train. The width of these positive pulses is a direct function of the difference between the monitored negative voltage level and the minimum voltage level of the triangular waveform.

In a similar manner, by comparing the instantaneous value of the triangular waveform with a monitored predetermined positive voltage level that is slightly less than the immediately preceding maximum voltage peak of the triangular waveform, the reference keying generator 73 generates a constant negative signal whenever the value of the triangular waveform is less than the monitored positive voltage level, and a positive voltage pulse whenever the value of the triangular waveform exceeds the monitored voltage level. As shown in FIG. 4, the output of the triangular waveform generator 70 is fed to a positive peak detector 78. During each cycle of the triangular waveform, a positive voltage signal that is a predetermined percentage of the preceding positive peak occurring during that cycle is stored. This stored signal is the monitored positive voltage level. The output of the positive peak detector 78 is fed to a comparator 79, which generates a positive signal whenever the output of the triangular waveform generator 70 is greater than the stored positive voltage signal, and a negative signal whenever the output of the triangular waveform generator 70 is less than the stored negative voltage signal. The resulting reference pulse train waveform is shown in FIG. 3E.

The cross-over points on the triangular waveform output of the generator 70, where the curve crosses the zero voltage reference level, which is determined as the level for which the area under the curve equals the area over the curve for a complete rotational cycle of the chopper 40, occur only during the dark intervals when the chopper 40 blocks radiation from passing into either the sample channel or the reference channel. A dark interval keying generator 71 is responsive to these cross-over points on the triangular waveform.

In the embodiment shown in FIG. 5, the dark interval keying generator 71 comprises means for monitoring predetermined positive and negative voltage levels, as of 1.5 volts, above and below, respectively, the zero voltage reference level. The output of the triangular waveform generator 70 is fed to an inverter 74 to generate an inverted triangular waveform. Both the triangular waveform and the inverted triangular waveform, i.e., the outputs from 70 and 74, are then fed to a NOR gate 75 having a predetermined positive threshold of, e.g., 1.5 volts. The output of the NOR gate 75 is positive whenever neither the output of the triangular waveform generator 70 nor the output of the inverter 74 exceeds the predetermined threshold, and is negative whenever either the output of the triangular waveform generator 70 or the output of the inverter 74 exceeds the predetermined threshold.

Whenever the output of the triangular waveform generator 70 is above or below these predetermined positive and negative voltage levels, appropriate electronic circuitry generates a constant negative voltage signal. However, whenever the output of the triangular waveform generator 70 has a value within the range defined by the predetermined positive and negative voltage levels on either side of the zero voltage reference level, the dark interval keying generator 71 generates a positive voltage pulse. The dark interval pulse train generated by the dark interval keying generator 71 is shown in FIG. 3F.

In the embodiment shown in FIG. 2, the positive pulses of the dark interval pulse train illustrated in FIG. 3F serve as a keying input to close a grounding switch 84, which causes a dark current signal indicative of any output of the photomultiplier tube 16 during a particular dark interval to be stored on a capactior 85. During the next subsequent sample or reference interval, as the case may be, the switch 84 is opened to cause the stored dark current signal to be subtracted from the output of the preamplifier 80. In this way, the sample and reference signals can be compensated for dark current. It is not essential that correction for dark current be accomplished in the aforedescribed manner. In some other embodiment, such dark current correction may be made in the sample and reference demodulators 81 and 82 or in the comparator 83.

In summary, the output of the comparator 83 is synchronized with the passing of radiation through the sample and reference channels by the response of the keying generators 71, 72 and 73 to particular points on the triangular waveform of FIG. 3C. The dark interval keying generator 71 is responsive to the zero voltage reference level cross-over points on the triangular waveform. This may be accomplished by a comparator means that constantly compares the temporally varying value of the output of the triangular waveform generator 70 with ground potential. The sample keying generator 72 is responsive to the minima on the triangular waveform shown in FIG. 3C. This may be accomplished by a comparator means that compares the instantaneous value of the output of the triangular waveform generator 70 with a previously stored minimum value. Similarly the reference keying generator 73 is responsive to the maxima of the triangular wave form shown in FIG. 3C. This may be accomplished by a comparator means that compares the instantaneous value of the output of the triangular waveform generator 70 with a previously stored maximum value.

It is significant that the actual maxima and minima of the output of the triangular waveform generator 70, rather than some selected voltage level for the output of the photocell 62, provides the keying input signals to the sample and reference demodulators 81 and 82. This feature eliminates dependence of the keying signals upon a fixed rate of rotation for the optical chopper 40.

With the present invention, if the rate of rotation of the chopper 40 were to fluctuate, the triangular waveform output of the generator 70 would continue to have maxima and minima that are synchronous with the passage of radiation through the reference and sample channels respectively. For example, if the rate of rotation of the chopper 40 were to decrease while the radiation beam is passing through the reference cell, the triangular waveform output of the generator 70 would continue to rise until the optical interrupter 60 switches to a negative voltage pulse at the temporal mid-point of the reference interval. The maximum voltage level of the triangular waveform when this switching occurs may be stored on a capacitor and used as a revised "standard" maximum voltage level for the reference keying generator 72. Similarly, the minimum voltage level of the triangular waveform when the switching occurs may be stored and used as a revised "standard" minimum reference level for the sample keying generator 72.

The generation of a single triangular waveform that is synchronized with the rotational motion of the chopper disc 40 is a salient feature of the present invention. It is recognized that one skilled in the art, having been apprised of the particular features disclosed herein, may provide means for generating a single waveform somewhat different from the generally triangular waveform shown in FIG. 3C, and may provide keying generators responsive to particular points on such a waveform for synchronizing particular operations of a spectrophotometer with particular rotational positions of an optical chopper. Any such variations on the theme of what is disclosed herein are deemed to be within the scope of the present invention. Accordingly, the present invention is limited only by the following claims.

What is claimed is:

1. The method of synchronizing the occurrence of events in the operation of a dual beam spectrophotometer with respect to the rotational motion of an optical chopper that directs radiation alternately into separate channels, said method comprising the steps of:
   a. generating a substantially square wave signal indicative of the rotational position of said chopper,
   b. integrating said square wave signal to provide a substantially triangular waveform,
   c. selecting particular cyclically recurring points on said triangular waveform, each particular cyclically recurring point being indicative of the occurrence of a particular event to be synchronized with respect to the rotational motion of said chopper,
   d. generating a plurality of pulse trains, each pulse train corresponding to a particular event to be synchronized with respect to the rotational motion of said chopper, the pulses of a particular one of said pulse trains occurring when the instantaneous value of said triangular waveform corresponds to a selected particular cyclically recurring point of said triangular waveform, and e. gating electrical circuitry for causing a particular event to occur in response to the occurrence of pulses of the particular pulse train corresponding to said event.

2. The method of claim 1 wherein said square wave signal is a bipolar signal of constant amplitude, and wherein said triangular waveform is bipolar.

3. The method of claim 2 wherein one of said selected particular cyclically recurring points on said triangular waveform is the cross-over point of said triangular waveform with respect to the zero reference level.

4. The method of claim 3 wherein the step of selecting said cyclically recurring cross-over point comprises using threshold discrimination means for sensing predetemined values above and below said cross-over point.

5. The method of claim 4 wherein the step of generating the pulse train whose pulses occur when the instantaneous value of said triangular waveform corresponds to said cyclically recurring cross-over point comprises generating a signal having a first level when the instantaneous value of said triangular waveform is outside the range included between said predetermined values, and having a second level when the instantaneous value of said triangular waveform is within the range included between said predetermined values.

6. The method of claim 3 wherein the pulse train, whose pulses occur when the instantaneous value of said triangular waveform corresponds to the cyclically recurring cross-over point of said triangular waveform, corresponds to the blocking of said radiation from said channels.

7. The method of claim 2 wherein one of said selected particular cyclically recurring points on said triangular waveform is the minimun of said triangular waveform.

8. The method of claim 7 wherein the step of selecting said cyclically recurring minimum point comprises comparing the instantaneous value of said triangular waveform throughout a given cycle with a predetermined negative value that is greater than the immediately preceding minimum of said triangular waveform by a selected amount.

9. The method of claim 8 wherein the step of generating the pulse train whose pulses occur when the instantaneous value of said triangular waveform corresponds to said cyclically recurring minimum comprises generating a signal having a first level when the instantaneous value of said triangular waveform is greater than said predetermined negative value, and having a second level different from said first level when the instantaneous value of said triangular waveform is less than said predetermined negative value.

10. The method of claim 7 wherein the pulse train, whose pulses occur when the instantaneous value of said triangular waveform corresponds to the cyclically recurring minimum of said triangular waveform, corresponds to the passing of said radiation into one of said channels.

11. A double beam spectrophotometer comprising a rotatable optical chopper for directing a radiation beam alternately through separate channels to a photodetector, means for generating a bipolar square wave signal indicative of the rotational position of said optical chopper, means for integrating said square wave signal to provide a substantially triangular waveform, and means for monitoring particular cyclically recurring points on said triangular waveform to generate a plurality of pulse trains, each pulse train corresponding to a particular event occurring in the operation of said spectrophotometer, the pulses of said pulse trains being electrical timing signals for synchronizing particular events in the operation of said spectrophotometer with the rotational motion of said optical chopper.

12. The spectrophotometer of claim 11 wherein said means for monitoring said particular cyclically recurring points on said triangular waveform comprises means for monitoring the cyclically recurring cross-over point of said triangular waveform with respect to the zero reference level.

13. The spectrophotometer of claim 12 wherein said means for monitoring said cyclically recurring cross-over point comprises threshold discrimination means for sensing predetermined values above and below said cross-over point for said triangular waveform.

14. The spectrophotometer of claim 11 wherein said means for monitoring said particular cyclically recurring points on said triangular waveform comprises means for monitoring the cyclically recurring maximum of said triangular waveform, where the value of said cyclically recurring maximum may vary from one cycle to another cycle.

15. The spectrophotometer of claim 14 wherein said means for monitoring said cyclically recurring maximum of said triangular waveform comprises means for comparing the instantaneous value of said triangular waveform throughout a given cycle with a predetermined positive value that is less than the immediately preceding maximum of said triangular waveform by a selected amount.

16. The spectrophotometer of claim 15 further comprising means for generating a pulse train having a first level when the instantaneous value of said triangular waveform is less than said predetermined positive value, and having a second level different from said frist level when the instantaneous value of said triangular waveform is greater than said predetermined positive value.

* * * * *